United States Patent [19]

Ushiro

[11] Patent Number: 4,654,791
[45] Date of Patent: Mar. 31, 1987

[54] INPUT/OUTPUT PAGING MECHANISM IN A DATA PROCESSOR

[75] Inventor: Sotaro Ushiro, Tokyo, Japan

[73] Assignee: Tokyo Shibaura Denki Kabushiki Kaisha, Kawasaki, Japan

[21] Appl. No.: 517,056

[22] Filed: Jul. 25, 1983

[30] Foreign Application Priority Data

Jul. 30, 1982 [JP] Japan ................. 57-132192

[51] Int. Cl.⁴ .............................. G06F 12/06
[52] U.S. Cl. .................................... 364/200
[58] Field of Search ... 364/200 MS File, 900 MS File

[56] References Cited

U.S. PATENT DOCUMENTS

| | | | |
|---|---|---|---|
| 4,084,227 | 4/1978 | Bennett et al. | 364/200 |
| 4,155,119 | 5/1979 | De Ward et al. | 364/200 |
| 4,173,783 | 11/1979 | Couleur et al. | 364/200 |
| 4,319,323 | 3/1982 | Ermolovich et al. | 364/200 |

Primary Examiner—Thomas M. Heckler
Attorney, Agent, or Firm—Cushman, Darby & Cushman

[57] ABSTRACT

In a data processor performing an input and output paging function, a main memory (MMU) and an input and output processor (IOP) connected to the MMU through a bus are provided. The MMU stores a list-service page table for mapping a logical space in which channel command entries are located, and a data service page table for mapping the data transfer areas specified by channel command entries, pointers for the respective page tables, and flags for the designation of a physical or logical address. The IOP reads the pointers from the MMU, refers to the respective page tables, determines whether the specified address is physical or logical, and translates it into an effective address.

14 Claims, 9 Drawing Figures

| CPH 0 | | 31 |
|---|---|---|
| WORD 0 | DEVICE ADDRESS | |
| WORD 1 | 1ST CCE POINTER | L D |
| WORD 2 | PTP1 (LIST) | |
| WORD 3 | PTP2 (DATA) | |
| WORD 4 | COMPLETION STATUS | |
| WORD 5 | THE NUMBER OF REAL DATA TRANSFER BYTES | |
| WORD 6 | COMPLETION CCE ADDRESS | |
| WORD 7 | | |

4,654,791

INPUT/OUTPUT PAGING MECHANISM IN A DATA PROCESSOR

BACKGROUND OF THE INVENTION

The present invention relates to an input/output paging mechanism in a data processor using a virtual memory.

The virtual memory permits the user to treat secondary storage as an extension of a main memory unit, thus giving the performance of a larger main memory.

A conventional construction of a data processor using a virtual memory is shown in FIG. 1.

In FIG. 1, a system control processor (SCP) 11, a main memory unit (MMU) 13 and input/output processors (IOP) 17, 18 are connected to a system bus 15. Further, a magnetic disk unit (MK) 19 and a floppy disk unit 20 are connected to the IOPs 17, 18, respectively. The system bus 15 comprises address, data and control lines. In particular, the control lines comprise 32 lines to be able to specify virtual addresses up to 4 giga bytes $(GB) = 4 \times 10^9$ bytes.

The SCP 11 controls the individual units connected to the system bus 15 under control of a program stored in the MMU 13 in which various programs and data are stored including channel programs and address translating tables (page tables) for the use of a list service and a data service. The list service defines the operation for accessing a channel command entry list (CCE list), and the data service defines the operation of a data transfer.

The IOPs 17 and 18 control the data flow between the I/O devices 19, 20 and the MMU 13. Thus, the release of the SCP 11 from the I/O processing permits the parallel operation of the SCP processing and the I/O processing. The I/O processing is carried out with a start I/O (SIO) instruction and a channel program. The SIO instruction includes an address specifying a start address of the channel program, a channel number and the I/O device number to be controlled. The execution of the SIO instruction by the SCP 11 triggers the IOP 17 to control the I/O operation. The channel program comprises the CCE list and a channel program header (CPH). The CCE list consists of a series of channel commands. The CPH includes a start address of the CCE list, completion status, the number of real data transfer bytes, completion CCE address and so on.

The channel program is stored in the MMU 13. The address space of the MMU 13 is 16 mega bytes (MB), for example, and is divided into physical blocks of words called pages, each having 4KB.

There are two types of addressing modes: a physical addressing mode and a logical addressing mode, as shown in FIGS. 2A and 2B. In the physical addressing mode, a physical address within an effective address space of the MMU 13 is specified in a displacement field of bits 0 through 31, for example. In the logical addressing mode, a logical page number which specifies the page in the virtual address space is specified in bits 8 to 19, and the relative address within the page is specified in bits 20 to 31 of the displacement field, for example.

When the SIO instruction is executed by the SCP 11, the specified IOP reads the CPH to obtain the start address of the CCE list. Then, the IOP 17 reads the corresponding CCE list based on the obtained start address. The IOP decodes and executes each CCE independently of the processing by the SCP 11. Executing the final CCE, the IOP 17 informs the SCP 11 of the termination of the data transfer using an interrupt function.

However, in the prior art system, a virtual address specified in the SIO instruction should be translated into an effective address by a software means such as an operating system (OS) under the control of the SCP 11. Thus, the increase of the overhead operations for the address translation degrades the system performance.

To eliminate the above drawbacks, an IOP having an address translating mechanism functioning as an input and output paging mechanism (I/O paging mechanism) has been developed. In this prior art system, a page table for holding the logical addresses specifying the CCEs is provided in the MMU 13. Further, a page table pointer (PTP1) specifying the page table is stored in the CPH. When the SIO instruction is executed by the SCP 11, the specified IOP reads the CPH to obtain a page table pointer (PTP) which specifies the start address of a page table (PT). Then, the IOP 17 reads the PT and obtains a PT word from the location specified by one part of a channel command entry pointer (CCEP). Then, the IOP 17 reads the CCE list and obtains the address of a data transfer area, data transfer size and so on from the locations specified by the PT word and another part of the CCEP. However, a page table for logically specifying a data transfer area is not provided in the MMU 13. Therefore, there is a severe restriction in that the data transfer area should be within a continuous space specified by the CCE. That is, the CCE list cannot be set over multiple pages. In such a situation, an OS designer must always keep in mind the locations of the data transfer area in a physical address mode.

SUMMARY OF THE INVENTION

An object of the invention is to provide an improved input/output paging mechanism wherein different pointers are provided for the list service and data service thereby providing flexibility in the software design.

In a preferred embodiment of the invention, a page table (PT1) for mapping a logical space at which CCEs are located and page table (PT2) for mapping data transfer areas specified by the CCEs are stored in the MMU. Further, a storage area for holding the PT1 pointer (PTP1) and a storage area for holding the PT2 pointer (PTP2) are provided in the IOP. The IOP reads these pointers from the CPH and loads them in the respective storage areas when the SIO instruction is executed by the CPU. The IOP then performs address translation referring to the specified page tables by the contents of the storage areas.

According to the present invention, the OS can treat all the data transfer areas in logical addresses. The I/O load of the OS can then be reduced. Further, the allowable parallel operation of the SCP and the IOP improves the system throughput.

The data transfer area can be located over multiple pages. Therefore, the flexibility of programming permits the software designer to develop programs without any attention to the locations of the CCE list and the data transfer area in the physical address mode.

BRIEF DESCRIPTION OF THE DRAWINGS

Other objects and features of the present invention will be apparent from the following description taken in connection with the accompanying drawings in which.

DETAILED DESCRIPTION OF THE PREFERRED EMBODIMENTS

Figures 3A, 3B:
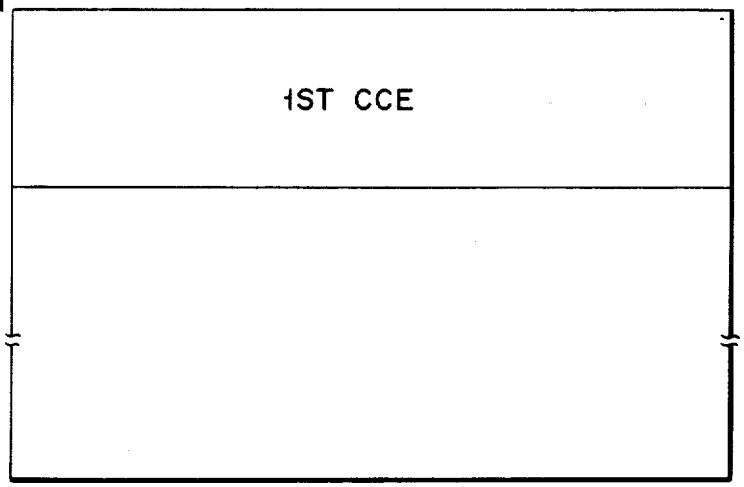
FIGS. 3A and 3B show CPH and CCE lists, respectively.

FIGS. 3A and 3B show formats of the CPH and CCE, respectively applied to this invention. The CPH comprises 8 words and memorizes a device address of an I/O device to be controlled by the IOP 17; a CCE pointer whose one part specifies an offset of the PT1 and another part specifies an offset of the PT2; flags "L" and "D" designating whether the virtual address (logical address) or the effective address (physical address) is used for the list service and the data service; the PTP1 and PTP2 for the PT1 and PT2; a completion status; the number of real data transfer bytes; and a completion CCE address.

FIG. 3B shows a CCE list in which a series of CCE's are listed. Each CCE includes a command for the IOP, data, data transfer size, and address (or addresses) representing an offset (or offsets) for the page table (and effective address space).

Further, a one-byte I/O command is assigned in bits 0 to 7 of the CCE and the command chain flag (CC) is assigned in bit 8. When the flag CC is at logic "1", the next CCE is executed after the above-mentioned CC is completed. When the flag CC at logic "0" is detected, the list service operation is completed after the execution of the CCE containing the CC of logic "0". The data chain flag DC is assigned in bit 9. When the DC flag is at logic "1", the contents of buffers dispersed in the MMU 13 are transferred without the need to consider their respective physical locations.

Figure 1:
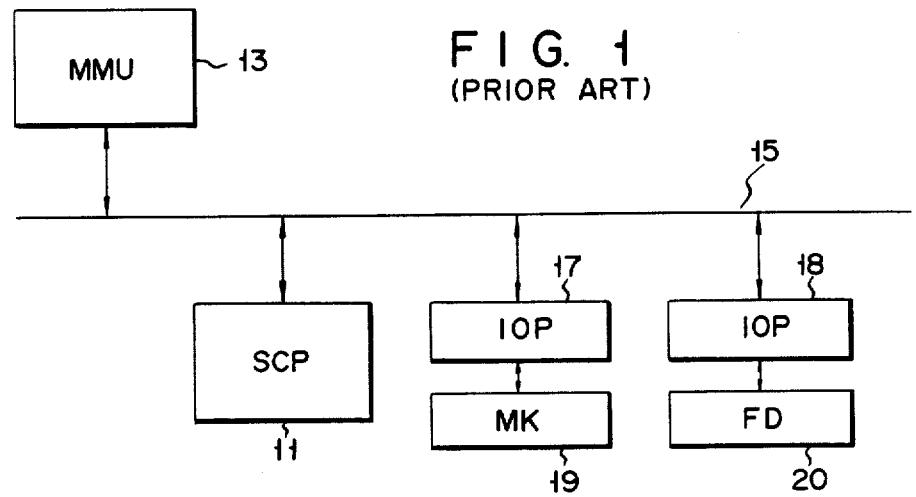
FIG. 1 is a block diagram showing a conventional construction of a data processing system adopting a virtual memory.
Figure 2A:
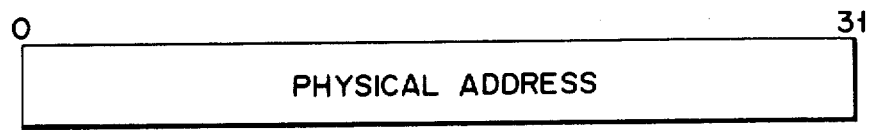
FIGS. 2A and 2B show conventional formats of addresses given by a channel command entry.
Figure 2B:
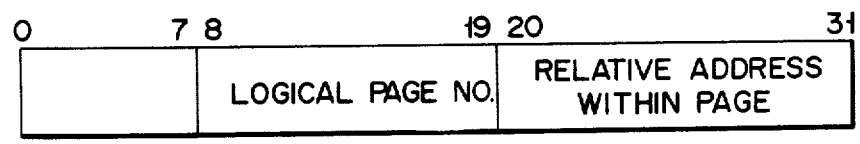
Figure 4:
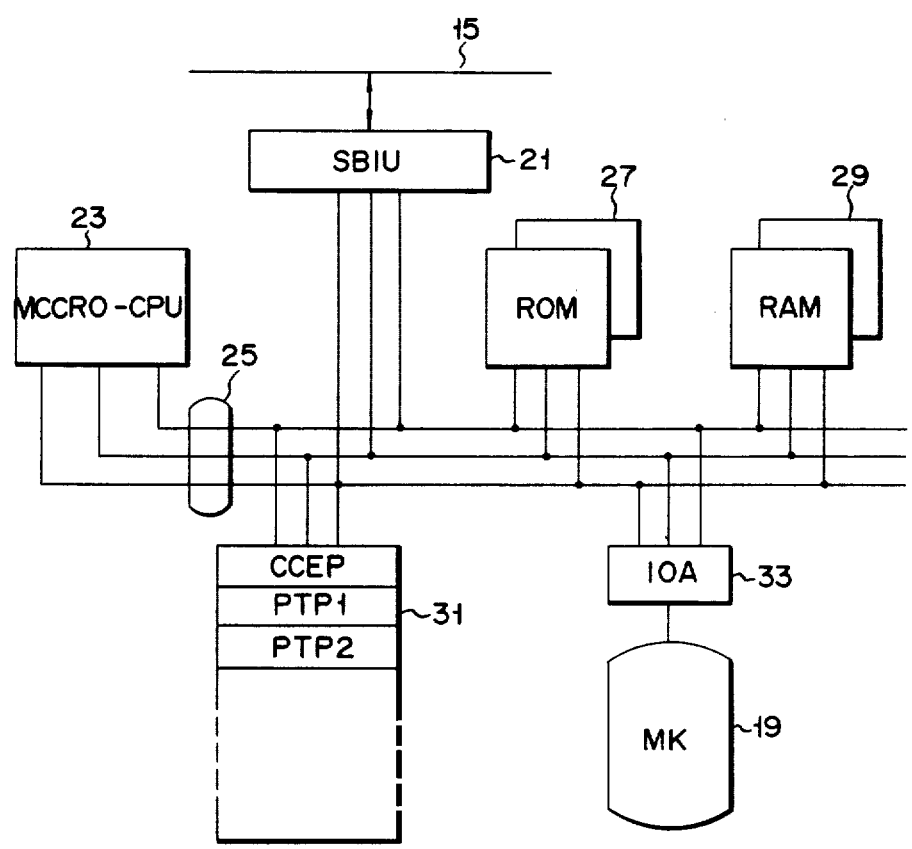
FIG. 4 is a block diagram showing an internal construction of the IOP.

FIG. 4 shows an internal construction of the IOP 17 shown in FIG. 1. The same numerals are used for the same parts in FIG. 1, and so a detailed description thereof will be omitted. In the figure, a system bus interface unit 21 is connected between the system bus 15 and an internal bus 25 for a microprocessor 23 for transferring commands, addresses and data. The microprocessor 23 decodes the commands from the ROM 27 and controls the data transfer.

The input/output paging mechanism realized by this invention can be controlled by the microprocessor (MCPU) 23. The RAM 29 functions as a work area for the microprocessor 23 and also functions as a buffer area for the data transfer between the MMU 13 and large capacity magnetic disk memory 19. A scratch pad memory (SPM) 31 stores the PTP1, PTP2 and the CCE pointer (CCEP). Though, in this embodiment the PTP1 and PTP2 are stored in the SPM, they may be stored in particular areas of the RAM 29 instead.

The I/O adapter 33 interfaces the large-capacity magnetic disk memory 19 and the IOP 17.

The system bus interface unit 21, ROM 27, RAM 29, SPM 31 and I/O adapter 33 are connected to the internal bus 25.

Figure 5:
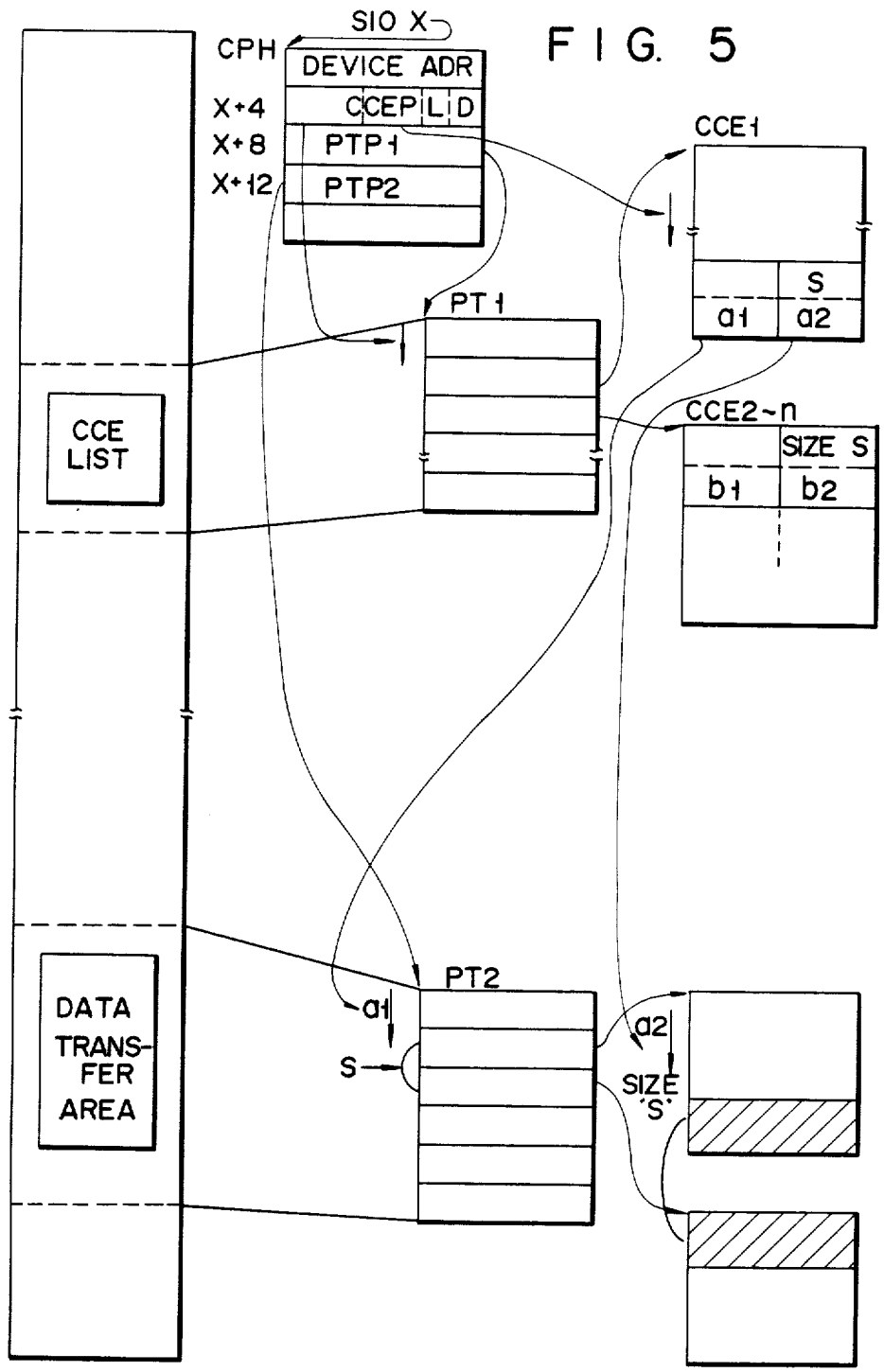
FIG. 5 is a conceptual diagram showing an operation of the invention.

FIG. 5 is a conceptual schematic diagram showing an operation of the IOP having an I/O paging mechanism of the present invention.

Now an operation of the IOP will be described referring to FIGS. 5 and 6.

Figure 6A:
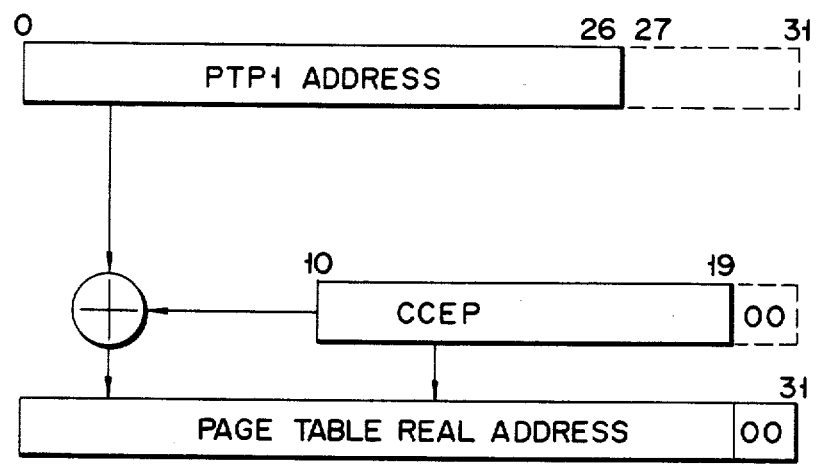
FIGS. 6A and 6B are conceptual diagrams showing an address generation in the list service.
Figure 6B:
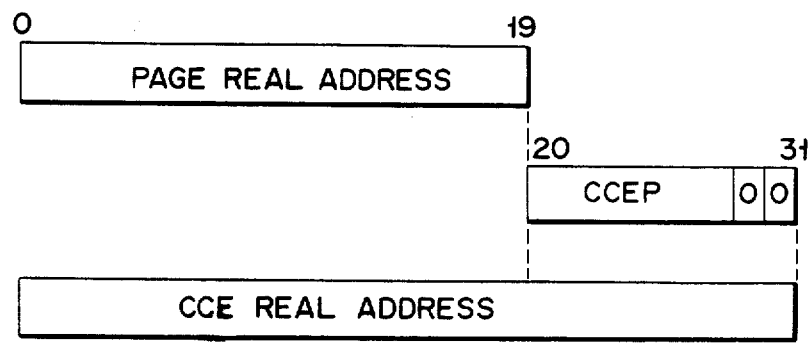
Figure 7A:
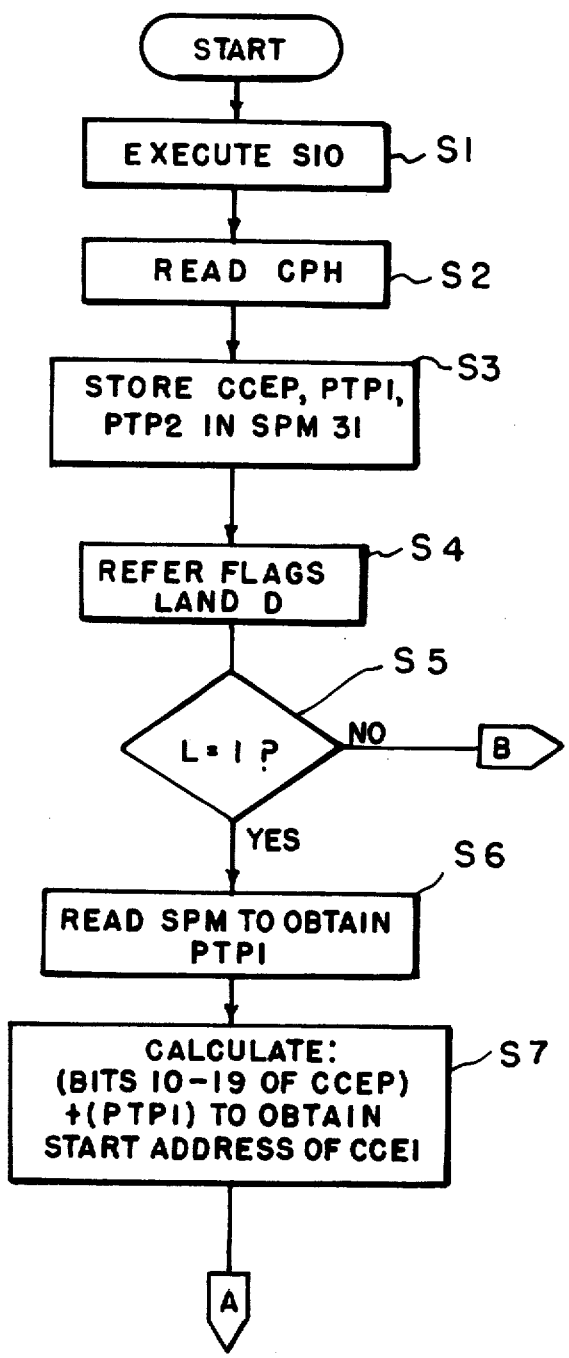
Figure 7B:
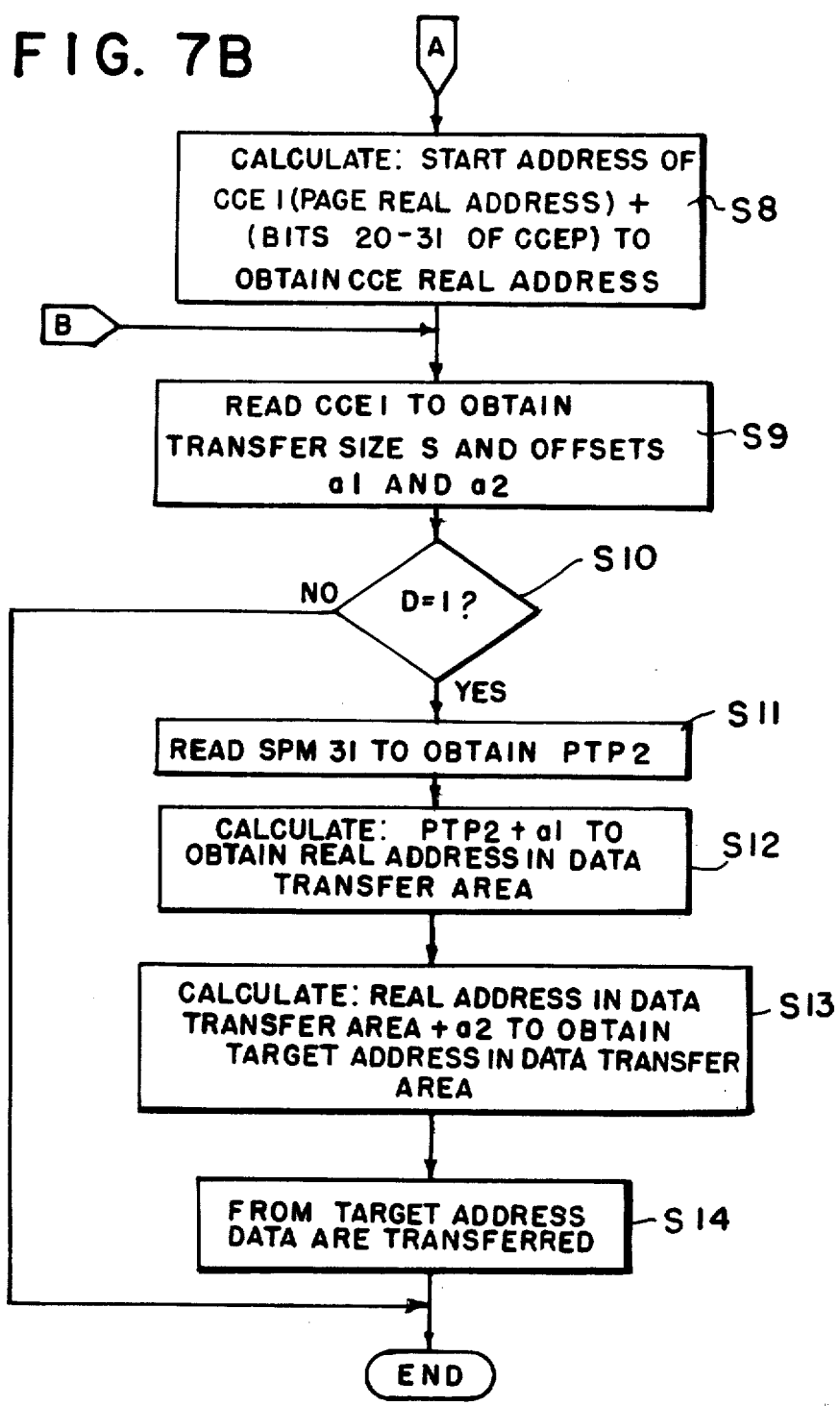

First, the SIO instruction is executed by the SCP 11. Thus, the IOP 17 (or 18) is triggered to perform the specified I/O operation. Based on the address given by the SIO instruction, the IOP 17 reads the CPH and stores the CCEP, PTP1 and PTP2 into the corresponding areas of the SPM 31. Then, the IOP 17 refers to the flags "L" and "D". Assume that the flags "L" and "D" are at logic "1". The PTP1 specifies the start address of the PT1, and bits 10 to 19 of the CCEP specify an offset from the start address of the PT1. Thus, as shown in FIG. 6A, the page table real address for PTP1 is obtained from the addition of the PTP1 and the CCEP bits 10–19. The contents of the page table word include the page real address which specifies the start address of the CCE list. Buts 20 to 31 of the CCEP specify an offset from the start address of the CCE list. Thus, as shown in FIG. 6B, the CCE real address is obtained from the addition of the page real address and bit 20 to bit 31 of the CCEP. Therefore, the IOP 17 achieves the data transfer size S and the offsets a1 and a2 used for achieving the locations of the data transfer area.

The IOP 17 accesses the PT2 based on the PTP2 and the offset a1 in the same manner as it accesses in the list service. Then, the obtained page table real address specifies the start address of the real page in which the data transfer area is located and the offset a2 specifies the offset from the start address of the data transfer area.

In this embodiment, the data transfer area is shown to be located over multiple pages. When the effective address for the data transfer area exceeds one page of 4KB, the OS automatically specifies the next page as the remaining data transfer area.

Many changes and modifications in the above embodiment can, of course, be carried out without departing from the scope of the invention.

What is claimed is:

1. An input and output paging apparatus in a data processing system, comprising:
    input and output processing means for processing input and output signals;
    an input and output device, coupled to said input and output processing means;
    system control processing means, coupled to said input and output processing means, for executing an input and output device start instruction to initiate an operation in said input and output device; and
    main memory means, coupled to said input and output processing means, for storing: (1) a channel command entry list having commands which control said input and output device, (2) a channel program including said channel command entry list and a channel program header which has reference information to refer to a data transfer area, (3) a first page table on which a logical space where said channel command entry list is allocated is mapped, and (4) a second page table on which a data transfer area specified by said channel command entry list is mapped;
    wherein said system control processing means is also for executing said input and output device start instruction to obtain start addresses of said first and second page tables and a first offset value for use as an offset address in said first page table, and a second offset value for use as an offset address in said channel command entry list.

2. An apparatus according to claim 5, in which said first and second page tables are represented by addresses which are one of physical and logical addresses.

3. An apparatus according to claim 1, wherein said main memory means is also for storing: (5) first flag means for representing which of a logical and physical space is mapped by said first page table, and (6) second flag means for representing which of a logical and physical space is mapped by said second page table, and wherein said first and second flag means are also for commanding said input and output processing means to perform address translations in accordance with said flags.

4. An apparatus according to claim 1, wherein said channel command entry list includes a third offset value for said second page table and a fourth offset value representing a second effective address space.

5. A data processing apparatus using a virtual memory, comprising:
   virtual memory means for storing and retrieving information;
   main memory means for storing a channel program header which includes: (1) a channel command entry list pointer, (2) a first page table pointer, and (3) a second page table pointer;
   I/O processor means, coupled to said virtual memory means and to said main memory means for:
   (1) reading said channel program header,
   (2) determining first and second offsets from said channel command entry list pointer which is within said channel program header,
   (3) performing an operation with said first page table pointer and said first offset to calculate a first page table real address,
   (4) performing an operation with said second offset and one of said addresses in step (3) to obtain an offset page table address,
   (5) reading data from said offset page table address,
   (6) obtaining a third offset from said data, and
   (7) performing an operation with said third offset and said second page table pointer to calculate an address of a data transfer area space.

6. Apparatus as in claim 5 wherein said first page table pointer is an address of a channel command entry list, which list includes commands to be executed by said virtual memory means, and said second page table pointer includes an address of said data transfer area space.

7. Apparatus as in claim 6 wherein said channel program header further includes (4) at least one flag register means for specifying a format of said address represented by at least one of said first and second table pointers.

8. Apparatus as in claim 7 wherein one state of said flag register means indicates an absolute address and another state of said flag register means indicates a logical address.

9. Apparatus as in claim 8 wherein there are first and second flag register means, wherein said first flag register means is for indicating that said first page table pointer is an absolute address when said first flag register means is in and one state and for indicating that said first page table pointer is a logical address when in said another state, and said second flag register means is for indicating an absolute address of said second page table pointer when in said one state and a logical address of said second page table pointer when in said another state.

10. Apparatus as in claim 5 wherein said I/O processor means is also for:
    (8) obtaining a fourth offset from said data,
    (9) performing an operation using said fourth offset and an address representing said second page table to obtain an address of an offset data transfer area space.

11. Apparatus as in claim 10 wherein said I/O processor means is also for:
    (10) obtaining a size indication from said data, said size information indicating a bit size of a data transfer.

12. Apparatus as in claim 5 wherein said main memory means is also for storing a plurality of channel program headers, and wherein said apparatus further comprises system control processor means for specifying an address of one of said channel program headers.

13. A method for controlling a virtual memory system, comprising the steps of:
    choosing a start I/O instruction;
    using an address included in the start I/O instruction to access a channel program header which includes a channel command entry list pointer, and first and second page table pointers;
    reading the channel command entry list pointer and the first and second page table pointer;
    reading first and second offsets from the channel command entry list pointer;
    determining a first start address of a first page table by performing an arithmetic operation using the first page table pointer, and the first offset;
    calculating a first offset address of the first page table by performing an arithmetic operation using at least two of: the first page table pointer, the first offset, and the second offset;
    reading channel command entry list information from the first offset address;
    determining third and fourth offsets within the channel command entry list information; and
    calculating second start and second offset addresses by performing arithmetic operations using the second page table pointer and the third and fourth offsets.

14. A method as in claim 13 wherein said channel program header also includes a flag register, wherein said method further comprises the steps of:
    reading the flag register; and
    determining from the state of the flag register whether said first and second page table pointers are one of: (a) absolute addresses, and (b) logical addresses.

* * * * *